Figure 1:
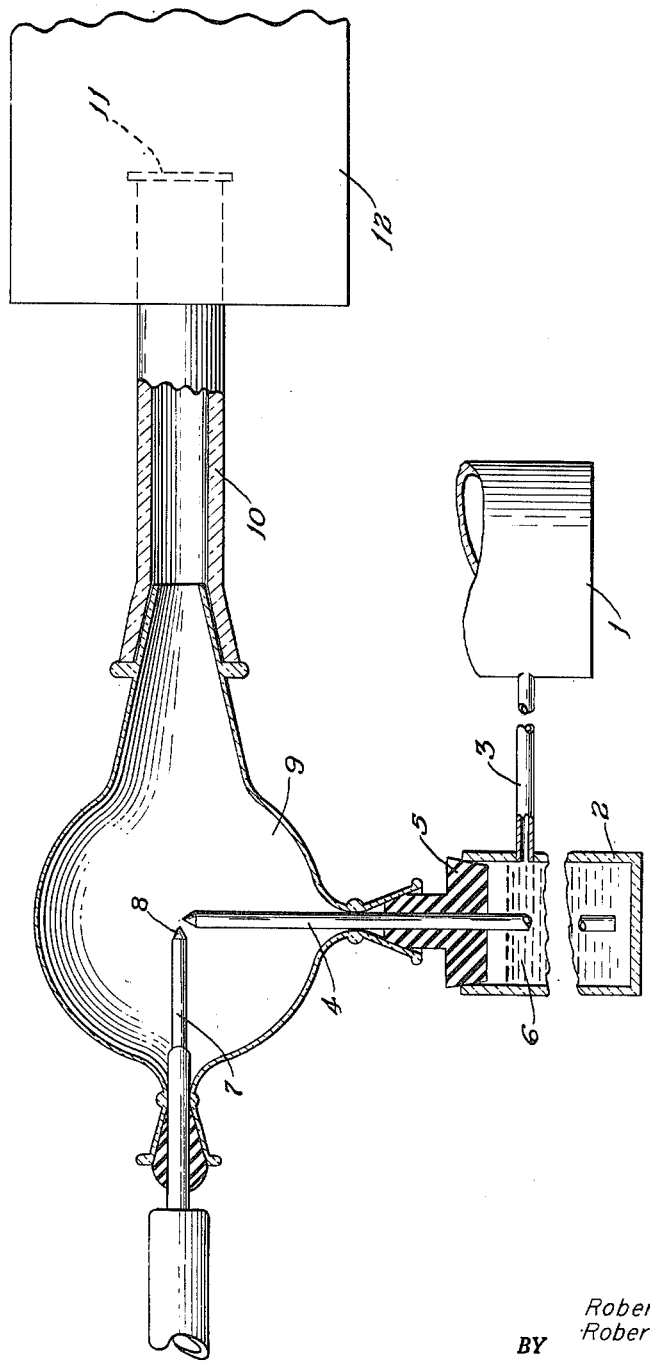

Feb. 25, 1958 R. S. HANSEN ET AL 2,824,784
METHOD FOR THE PREPARATION OF STABLE ACTINIDE METAL
OXIDE-CONTAINING SLURRIES AND
OF THE OXIDES THEREFOR
Filed Sept. 7, 1956

INVENTORS
Robert S. Hansen
Robert E. Minturn
BY
Roland A. Anderson
ATTORNEY

United States Patent Office 2,824,784
Patented Feb. 25, 1958

2,824,784

METHOD FOR THE PREPARATION OF STABLE ACTINIDE METAL OXIDE-CONTAINING SLURRIES AND OF THE OXIDES THEREFOR

Robert S. Hansen, Ames, Iowa, and Robert E. Minturn, Oak Ridge, Tenn., assignors to the United States of America as represented by the United States Atomic Energy Commission Application September 7, 1956, Serial No. 608,641

6 Claims. (Cl. 23—14.5)

This invention deals with a method of preparing metal oxides of a very fine particle size and of forming suspensions therefrom of a great stability.

In neutronic reactors, and in particular in the so-called homogeneous reactors, the fuel is used in the form of finely divided particles which are suspended in a liquid moderator and/or coolant. It has been found rather difficult to obtain the oxide in particles fine enough so as to keep them suspended in the liquid for a relatively long period of time.

It is an object of this invention to provide a process for the preparation of metal oxide powder of a maximum particle size of 75 m$\mu$.

It is another object of this invention to provide a process for the manufacture of slurries of metal oxides, for instance for use in neutronic reactors, which have a low viscosity so that pumping operations are facilitated.

It is finally still another object of this invention to provide a process for the preparation of metal oxide slurries which settle very slowly and thus are of great stability so that the state of suspension is maintained therein for a long period of time even when pumping or agitation is discontinued.

These and other objects are accomplished by dissolving a metal nitrate in a combustible organic solvent, atomizing the solution formed, igniting the atomized solution whereby metal oxide of a particularly fine particle size is formed, and collecting the metal oxide particles. The size of the particles depends, of course, on the fineness of the spray. In order to prepare the stable suspension from these metal oxide particles, the latter are dispersed in a colloid mill in an aqueous solution of a substance which is strongly adsorbable by the oxide, e. g. of NaOH, Na$_2$HPO$_4$ and Na$_2$CO$_3$; solutions containing about 5 N NaOH and 0.5 M Na$_2$HPO$_4$, respectively, have given especially good results. The slurry formed is then decanted and washed with water and these two steps are repeated until incipient stability is reached. Thereafter the slurry is electrodialized until the specific conductance is suitably low, e. g. 10$^{-5}$ ohms$^{-1}$.

Various kinds of organic solvents are usable for forming the nitrate solution, as long as they are combustible. Alcohols, ketones, esters and alkyl phosphates, for instance, are satisfactory. The following substances are examples of suitable solvents:

Methyl alcohol
Ethyl alcohol
Propyl alcohol
Isobutyl alcohol
n-Heptanol
n-Octanol
Tert-amyl alcohol
2-methyl-2-pentanol
2-methyl-2-hexanol
2-methyl-2-heptanol
2-ethyl hexanol
Heptadecanol (3,9 diethyl-6-tridecanol)
Diethyl ether of ethylene glycol (diethyl "Cellosolve")
Dibutyl ether of ethylene glycol (dibutyl "Cellosolve")
Dibutyl ether of diethylene glycol (dibutyl "Carbitol")
2(2-ethylbutoxy)ethanol (2-ethylbutyl "Cellosolve")
Dibutyl ether of tetraethylene glycol
Diethyl carbinol
Sec-butyl carbinol
Methyl n-amyl carbinol
Diisopropyl carbinol
Methyl n-propyl ketone
Methyl isobutyl ketone (also called hexone)
Diisopropyl ketone
Acetone
Methyl n-amyl ketone
n-Propyl acetate
Isopropyl acetate
Sec-butyl acetate
n-Butyl acetate
Isobutyl acetate
n-Amyl acetate
2-ethylbutyl acetate
Methyl propionate
Ethyl propionate
Ethyl Butyrate Mixtures of the above-mentioned solvents are also satisfactory.

In the following some examples of the process of this invention are given for illustrative purposes only; the invention is not to be limited to the details given therein.

*Example I*

In this experiment an apparatus was used a sectional view of which is shown in the accompanying drawing. That apparatus comprised a 5-gallon reservoir in which a solution of 125 g. of uranyl nitrate hexahydrate per 1 liter of acetone was stored. The reservoir 1 was connected with an 8-inch long vertical test tube 2 by tubing 3 so that the solution was maintained automatically at a fixed level in the test tube. A vertically arranged fuel supply capillary 4 extended through a stopper 5 into the test tube and was immersed in the acetone solution 6. Transversely to the fuel supply capillary and in horizontal position there was arranged an air supply capillary 7. The air capillary was a tube of 2 mm. inner diameter which was drawn at the tip into a nozzle 8 of 0.7 mm. inner diameter; the fuel supply capillary had an inner diameter of 0.5 mm. Both capillaries extended into the bulb portion of a 500-ml. Kjeldahl flask 9 until almost touching to provide a sprayer. The flask was arranged so that the longitudinal axis of its neck was horizontal. A burner nozzle 10 was attached to the neck of the Kjeldahl flask; this nozzle was formed of a 20 mm. tube of a heat-resistant glass and its mouth was 25 cm. from the axis of the fuel supply capillary. A 20-mesh platinum screen 11 was placed over the mouth of the burner nozzle to decrease turbulence and insure sustained burning. The burner nozzle with the screen extended into a 6-foot long, 6-inch wide refractory-lined collector tube 12. At the end of the collector tube a 28,000-volt Cottrell-type electrostatic precipitator (not shown) was installed. During operation the whole system was inclined at an angle of about 10 degrees from the horizontal position to permit a back flow of condensed fuel and to give a slight chimney effect to the collector tube.

Air of about 80 p. s. i. was introduced through the air supply capillary whereby the acetone solution was sucked through the fuel supply capillary. A match was held to the end of the burner nozzle, and the mixture of acetone solution and air was ignited. The air supply was adjusted until the flame burned evenly at the tip of the nozzle. On completion of the combustion the collector tube was allowed to cool whereby the smoke of uranium oxide deposited; in part of the operation the Cottrell precipitator was left idle, while it was used in the other part. The oxide smoke was then scraped off the walls of the collector tube. The powder was washed with water and subsequently with acetone and finally dried at about 110° C. The powder was found to be uranium oxide of which about 70% was $U_2O_5$; it had an average particle size of 60 m$\mu$ and a surface area of 12 square meters per gram. The yield, when the electrostatic precipitator was idle, was 25% of the stoichiometric amount while, with the precipitator in use, the yield amounted to 30%.

10 g. of the uranium oxide thus obtained were introduced into hot aqueous 6 N sodium hydroxide to yield about 100 ml. of mixture and dispersed therein in a colloid mill; the aqueous slurry obtained was then electrodialyzed. The neutral slurry resulting thereby showed very slight settling at room temperature in 24 hours, and at 250° C. it showed slight to moderate settling after 5 hours. At both temperatures, though, the slurry could be readily redispersed simply by shaking.

Another 10 g. portion of the uranium oxide was introduced into hot aqueous 0.5 M disodium phosphate in an amount to yield 100 ml. of mixture; the oxide was dispersed in a colloid mill, and the slurry obtained was then electrodialyzed. This slurry also showed very slight settling in 24 hours at room temperature and the small quantity precipitated could readily be redispersed by shaking. When the slurry was held at 250° C., very slight settling was observed in 5 hours, which showed a slight superiority of the sodium phosphate over the sodium hydroxide. The slurry obtained in this example had a viscosity of between 9 and 10 millipoises at 30° C.

When a less concentrated solution of uranyl nitrate in acetone was used, namely, one containing 100 g. of uranyl nitrate hexahydrate per liter of acetone, it was found that the platinum screen over the mouth of the burner nozzle could be dispensed with and a constant flame was still maintained.

*Example II*

A quantity of 100 g. of $Th(NO_3)_4 \cdot 4H_2O$ was introduced into 150 ml. of ethanol, and the mixture was heated until a clear solution was obtained, which took about 1 hour; thereafter 1 liter of acetone was added to the solution. A small quantity of insoluble material formed which was allowed to settle, and the clear supernatant was then used for the spray. The spray was ignited in the same apparatus used for Example I, except no platinum screen was used, and the powder obtained thereby was washed, first with water and then with acetone, and finally dried at about 100° C. The thorium oxide obtained had an average particle size of 38 m$\mu$, a surface area of 16.6 square meters per gram, and the yield was about 30% of the theoretical yield. The oxide was then dispersed in the form of a slurry by the steps described in Example I.

The pH value of the slurries produced by the process of this invention can be controlled, after electrodialysis, by adding a buffer thereto. Suitable substances therefor are monosodium and disodium phosphate used to provide concentrations in the aqueous medium of about 0.001 M. Higher concentrations of these phosphates caused flocculation.

The process of this invention is applicable to the production of the various oxides of all actinide elements and of stable slurries therefrom.

This application is a continuation-in-part of application Serial No. 339,445, filed on February 27, 1953, now abandoned.

What is claimed is:

1. A process of preparing a stable slurry of the oxide of an actinide element, comprising dissolving the nitrate of said actinide element in a combustible organic solvent, converting the solution obtained into a spray, igniting the spray whereby an oxide powder is obtained, slurrying said oxide powder in an aqueous solution of a substance which is adsorbable by said oxides, dispersing the slurry in a colloid mill whereby a suspension is obtained, and electrodialyzing said suspension until a low specific conductance is reached.

2. A process of preparing a stable slurry of the oxide of an actinide element, comprising dissolving the nitrate of said actinide element in a combustible organic solvent, converting the solution obtained into a spray, igniting the spray whereby an oxide powder is obtained, slurrying said oxide powder in an aqueous solution of a substance which is adsorbable by said oxides, alternately decanting and washing the slurry with water until an incipient stability is obtained, electrodialyzing said slurry until a low specific conductance is reached, and dispersing the slurry in a colloid mill whereby a stable suspension is obtained.

3. The process of claim 1 wherein said oxide-adsorbable substance is sodium hydroxide.

4. The process of claim 3 wherein the actinide element is uranium and the uranium oxide is ground in about 6 N sodium hydroxide at elevated temperature.

5. The process of claim 1 wherein said oxide-adsorbable substance is disodium phosphate.

6. The process of claim 5 wherein the sodium phosphate solution used has a concentration of about 0.5 M.

References Cited in the file of this patent

UNITED STATES PATENTS

| | | |
|---|---|---|
| 1,850,286 | Mittasch | Mar. 22, 1932 |
| 2,155,119 | Ebner | Apr. 18, 1939 |
| 2,527,231 | Vonnegut | Oct. 24, 1950 |
| 2,626,874 | Pipkin | Jan. 27, 1953 |